(12) United States Patent
Miyazono

(10) Patent No.: US 10,958,121 B2
(45) Date of Patent: Mar. 23, 2021

(54) ROTATING ELECTRICAL MACHINE

(71) Applicant: TOYOTA JIDOSHA KABUSHIKI KAISHA, Toyota (JP)

(72) Inventor: Hideaki Miyazono, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 16/439,848

(22) Filed: Jun. 13, 2019

(65) Prior Publication Data

US 2020/0021155 A1 Jan. 16, 2020

(30) Foreign Application Priority Data

Jul. 13, 2018 (JP) .............................. JP2018-133388

(51) Int. Cl.
*H02K 1/32* (2006.01)

(52) U.S. Cl.
CPC ...................................... *H02K 1/32* (2013.01)

(58) Field of Classification Search
CPC ....................................................... H02K 1/32
See application file for complete search history.

(56) References Cited

U.S. PATENT DOCUMENTS 10,320,247 B2 * 6/2019 Horii ........................ H02K 1/32
2009/0015081 A1 1/2009 Takenaka et al.
2010/0066179 A1 * 3/2010 Oda .......................... B60L 13/03
  310/12.29
2014/0070600 A1 * 3/2014 Park .......................... F16C 3/02
  301/6.5
2015/0214817 A1 * 7/2015 Kim .......................... H02K 9/19
  310/54
2018/0115208 A1 4/2018 Nishida et al.
2019/0234406 A1 * 8/2019 Homma ................... H02K 1/20

FOREIGN PATENT DOCUMENTS

| CN | 101627523 A | 1/2010 |
| CN | 105262280 A | 1/2016 |
| CN | 107979233 A | 5/2018 |
| JP | 2018-27003 A | 2/2018 |

* cited by examiner

*Primary Examiner* — Alexander Talpalatski
(74) *Attorney, Agent, or Firm* — Oliff PLC

(57) ABSTRACT

An annular rotor-side circumferential wall is provided to stand on an end surface of a rotor. An arc-shaped case-side circumferential wall is provided to stand on an inner wall surface of an end cover facing the end surface of the rotor, in close proximity to the rotor-side circumferential wall. A coolant reservoir for receiving and storing a coolant is formed by the end surface of the rotor, the inner wall surface of the end cover, the rotor-side circumferential wall, and the case-side circumferential wall. A rotor core has a coolant flow passage extending and penetrating in a direction along a rotational axis. The coolant flow passage is arranged to be open with respect to the coolant reservoir. The coolant flowing from the coolant reservoir into the coolant flow passage cools the rotor core from inside.

2 Claims, 6 Drawing Sheets

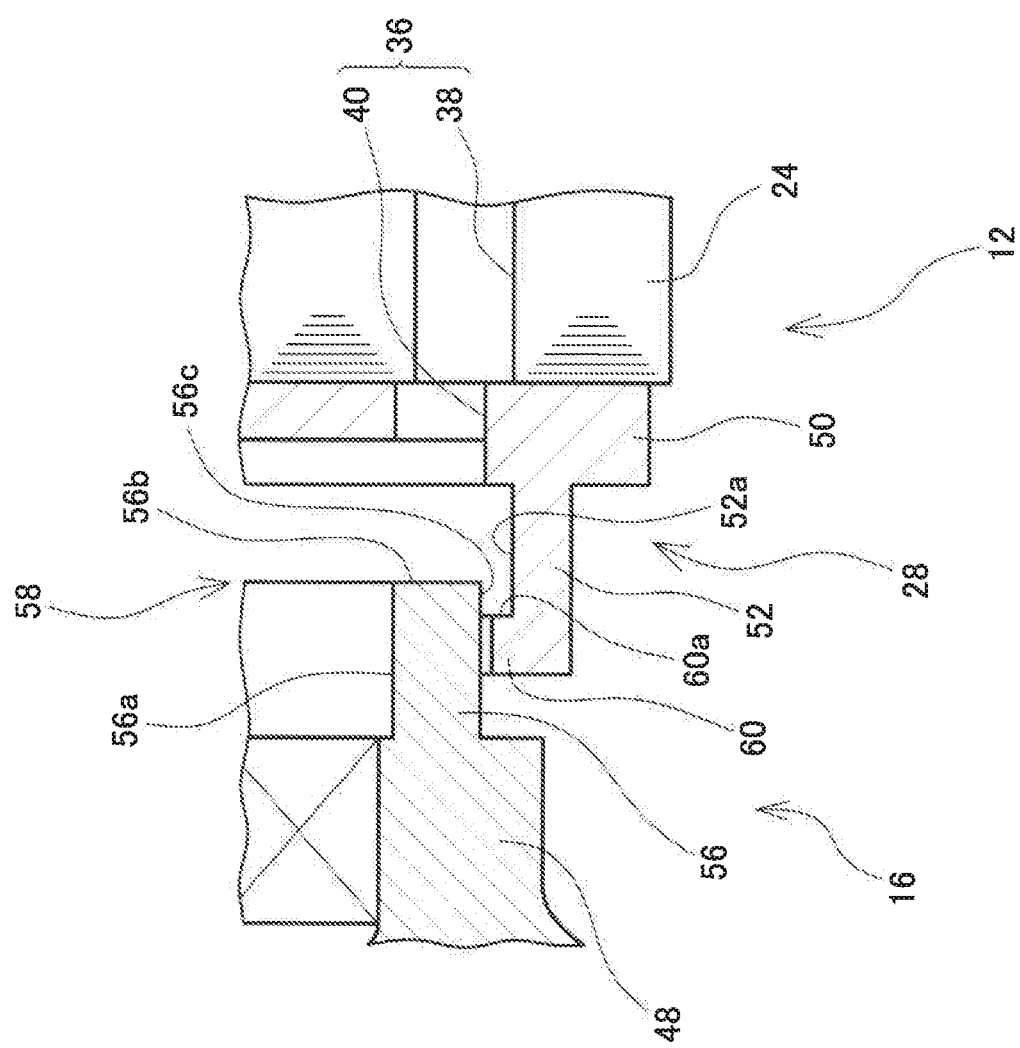

ROTATING ELECTRICAL MACHINE

CROSS REFERENCE TO RELATED APPLICATION

This application claims priority to Japanese Patent Application No. 2018-133388 filed on Jul. 13, 2018 which is incorporated herein by reference in its entirety including the specification, claims, drawings, and abstract.

TECHNICAL FIELD

The present disclosure relates to a rotating electrical machine, and more particularly to a rotor cooling structure.

BACKGROUND

There have been known electric motors which convert electric energy into kinetic energy of rotation, electric generators which convert kinetic energy of rotation into electric energy, and further electric devices functioning as both the electric motor and the electric generator. These electric devices will be hereinafter referred to as the rotating electrical machines.

JP 2018-27003A discloses a motor which performs cooling with oil. Oil is supplied to a motor (2) through a first oil passage (91) and a second oil passage (92). The first oil passage (91) includes a hollow shaft (21), and the oil is supplied through the shaft (21) to a core through-hole (24e) in a rotor core (24). The second oil passage (92) supplies the oil to a reservoir (98) located on the upper side of the motor (2). The oil is supplied from the reservoir (98) to a coil end (31a) of a stator (30). The reference signs in parentheses are the signs used in JP 2018-27003A, and are not related to signs used in the description of an embodiment of the present application.

SUMMARY

Due to the structure of a rotating electrical machine, particularly the structure of an output shaft of the rotating electrical machine and the periphery, it is sometimes impossible to supply a coolant, such as oil, to the inside of a rotor through the output shaft.

The present disclosure aims to enable supply of the coolant to the inside of the rotor without passing through the output shaft of the rotating electrical machine.

A rotating electrical machine according to the present disclosure comprises a case, and a rotor supported rotatably about a rotational axis by the case. The rotating electrical machine has a coolant reservoir located adjacent to a rotor end surface and configured to store a coolant. The coolant reservoir is formed by a first side surface defined by the rotor end surface, a second side surface defined by a case inner wall surface facing the rotor end surface, and a circumferential surface defined by a circumferential wall extending in a circumferential direction around the rotational axis between the rotor end surface and the case inner wall surface. The circumferential wall includes a case-side circumferential wall standing on the case inner wall surface and extending in the circumferential direction around the rotational axis, and a rotor-side circumferential wall standing on the rotor end surface and extending over an entire circumference around the rotational axis. Further, the rotating electrical machine has a coolant flow passage extending and penetrating the rotor in a direction along the rotational axis. One end of the coolant flow passage is arranged to be open with respect to the coolant reservoir.

The coolant is capable of flowing from the coolant reservoir into the coolant flow passage and cooling the rotor from inside.

The rotor-side circumferential wall is located at a position radially further outward than the case-side circumferential wall, and a distal end edge of the rotor-side circumferential wall may have an inward flange extending radially inward and having a distal end adjacent to an outer surface of the case-side circumferential wall. It is possible to narrow the gap between the rotor-side circumferential wall and the case-side circumferential wall, and storing the coolant is easy.

The rotor may include: rotor core plates stacked in a direction along the rotational axis to form a rotor core; and end plates located at both ends of the stacked rotor core plates; the end plate located on the coolant reservoir side may have an end plate cooling hole formed to be a part of the coolant flow passage; and each of the rotor core plates may have a core plate cooling hole formed to be a part of the coolant flow passage, at a position displaced radially further outward from the end plate cooling hole.

By displacing the end plate cooling hole and the core plate cooling hole from each other in a radial direction, it is possible to create a slope portion in the coolant flow passage. Then, a centrifugal force caused by rotation of the rotor acts on the coolant in the slope portion, thereby facilitating the flow in the coolant flow passage.

Even when the coolant cannot be supplied to the inside of the rotor through the output shaft of the rotating electrical machine, it is possible to supply the coolant to the inside of the rotor from the rotor end surface.

BRIEF DESCRIPTION OF DRAWINGS

An embodiment of the present disclosure will be described by reference to the following figures, wherein:

FIG. 6 is a schematic view showing a structure of a coolant reservoir.

DESCRIPTION OF EMBODIMENT

Figure 1:
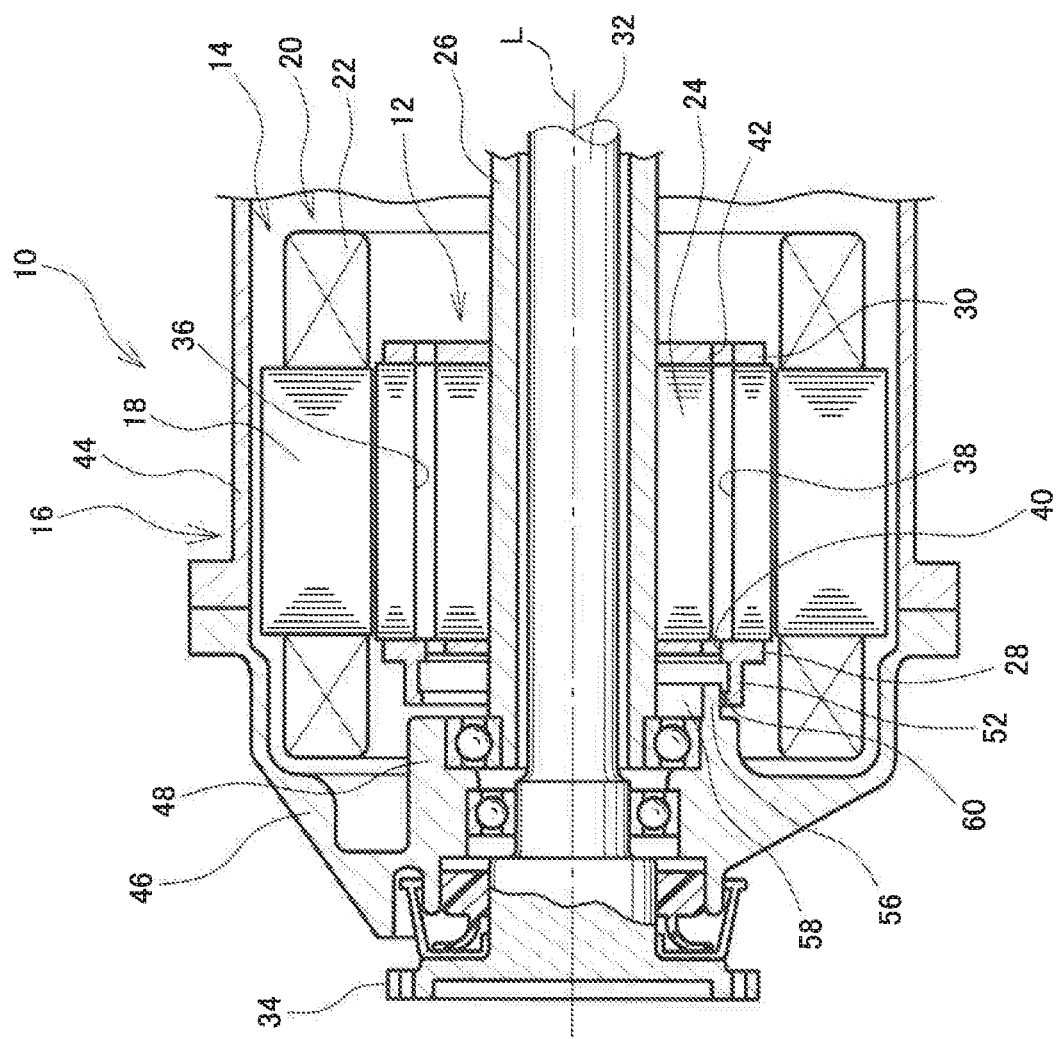
FIG. 1 is a schematic diagram showing a cross section of a rotating electrical machine of the present embodiment.

Hereinafter, an embodiment of the present disclosure will be described in conjunction with the drawings. FIG. 1 is a cross-sectional view schematically showing an essential configuration of a rotating electrical machine 10 of the present embodiment. The rotating electrical machine 10 includes a rotor 12 supported rotatably about a rotational axis L, and a stator 14 arranged to surround the rotor 12. The rotor 12 and the stator 14 are stored in a case 16, the rotor 12 is rotatably supported by the case 16, and the stator 14 is fixed to the case 16. The rotating electrical machine 10 is arranged so that the rotational axis L is horizontal when the rotating electrical machine 10 is installed or is in use. Hereinafter, a direction along the rotational axis L is referred to as the axial direction, a direction circling around the rotational axis L is referred to as the circumferential direction, and a direction orthogonal to the rotational axis L is referred to as the radial direction.

The stator 14 has the shape of a cylinder as a whole, and includes a stator core 18 having a plurality of teeth arranged at intervals in the circumferential direction on an inner circumference of the cylinder, and coils 20 wound around the teeth. The stator core 18 is formed by stacking a large number of electromagnetic steel plates formed in a predetermined shape, in a direction along the rotational axis L. In FIG. 1, only portions of the coils 20 protruding from the end surfaces in the axial direction of the stator 14; that is, so-called coil ends 22, appear. By causing a predetermined alternating current to flow in the coils, a rotating magnetic field is formed in the space inside the cylinder of the stator 14.

The rotor 12 includes a rotor core 24 substantially in the shape of a cylinder, and a rotor shaft 26 penetrating the rotor core 24 along the center line of the cylinder. The rotor core 24 is formed by stacking a large number of electromagnetic steel plates formed in a predetermined shape, in a direction along the rotational axis L. The electromagnetic steel plates forming the rotor core 24 are referred to as the rotor core plates. The rotor shaft 26 is supported by the case 16 through a bearing so that the center line thereof coincides with the rotational axis L. The rotor core 24 is sandwiched between end plates 28 and 30 from respective ends in the axial direction. The end plate 28 is referred to as the first end plate 28, and the end plate 30 is referred to as the second end plate 30. The rotor 12 interacts with a rotating magnetic field formed by the stator 14, and rotates about the rotational axis L.

The rotor core 24 and the rotor shaft 26 are coupled together and rotatable, as a unit, around the rotational axis L. The rotor shaft 26 is a hollow shaft, and a transmission shaft 32 is placed in the inner space to pass through the space. The transmission shaft 32 is also rotatably supported by the case 16 through a bearing, and is further coupled to the rotor shaft 26 on the right outside of the range shown in FIG. 1. Provided on the left end of the transmission shaft 32 is a shaft coupling 34 for coupling to another shaft or an object to be driven.

In the rotor 12, a plurality of coolant flow passages 36 extending in a direction along the axial direction are arranged in the circumferential direction. Each coolant flow passage 36 is formed by connecting a hole (hereinafter referred to as the core plate cooling hole 38) formed in each of the rotor core plates forming the rotor core 24 to holes 40, 42 formed in the first and second end plates 28, 30. The hole 40 in the first end plate 28 is referred to as the first end plate cooling hole 40, and the hole 42 in the second end plate 30 is referred to as the second end plate cooling hole 42.

The case 16 includes a case main body 44 surrounding the stator 14, and an end cover 46 covering an open end of the case main body 44. The end cover 46 has a bearing holding portion 48 for holding the bearings that support the rotor shaft 26 and the transmission shaft 32.

Figure 2:
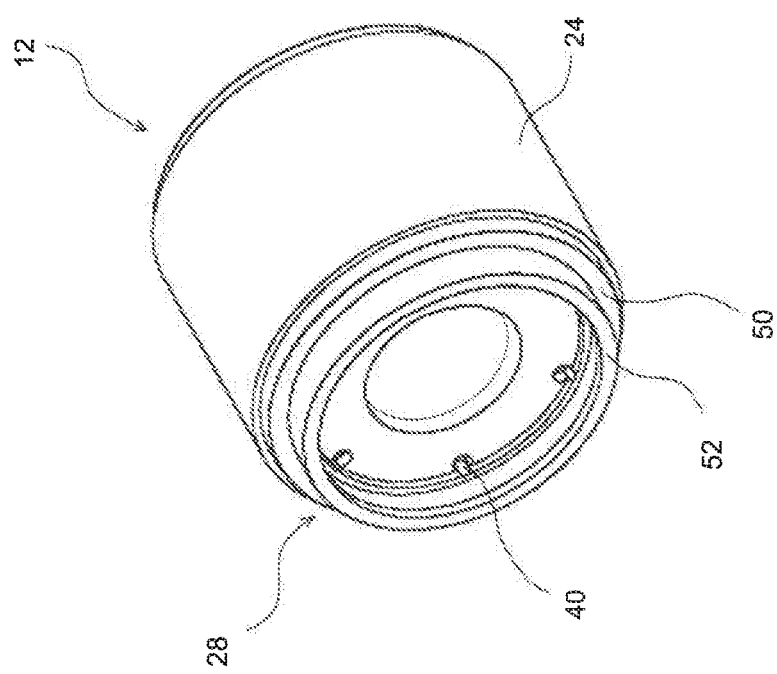
FIG. 2 is a perspective view showing a rotor.
Figure 3:
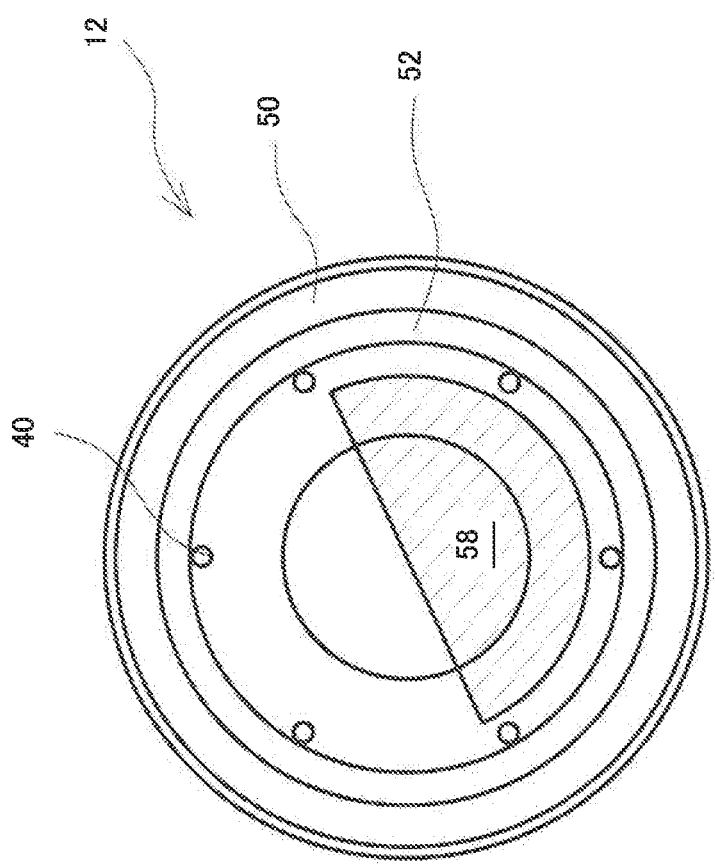
FIG. 3 is a view showing an end surface of the rotor.

FIG. 2 is a perspective view showing the rotor 12, and FIG. 3 is a view showing an end surface of the rotor 12 on the end cover 46 side. The first end plate 28 is located adjacent to an end of the rotor core 24 on the end cover 46 side. The first end plate 28 includes an annular plate-like base plate portion 50 having a hole at the center for allowing the rotor shaft 26 to pass therethrough, and a rotor-side circumferential wall 52 that is an annular circumferential wall disposed upright on the base plate portion. The surface of the base plate portion 50 facing the end cover 46 is the end surface of the rotor 12, and the rotor-side circumferential wall 52 is a wall standing on the outside of this end surface and extending over the entire circumference around the rotational axis L. The above-mentioned first end plate cooling holes 40 are formed in the base plate portion 50 adjacent to the inner side of the rotor-side circumferential wall 52.

Figure 4:
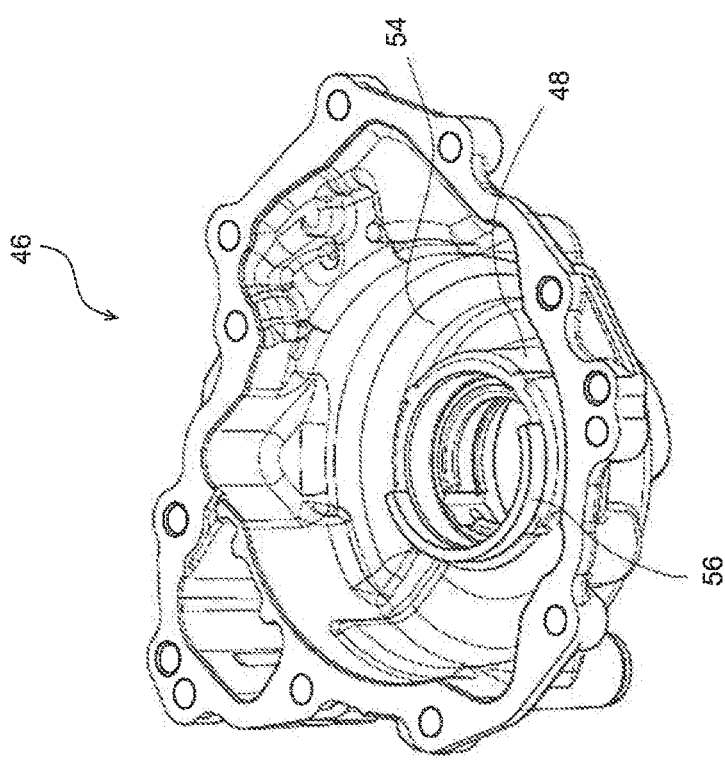
FIG. 4 is a perspective view showing an end cover that is a part of a case.
Figure 5:
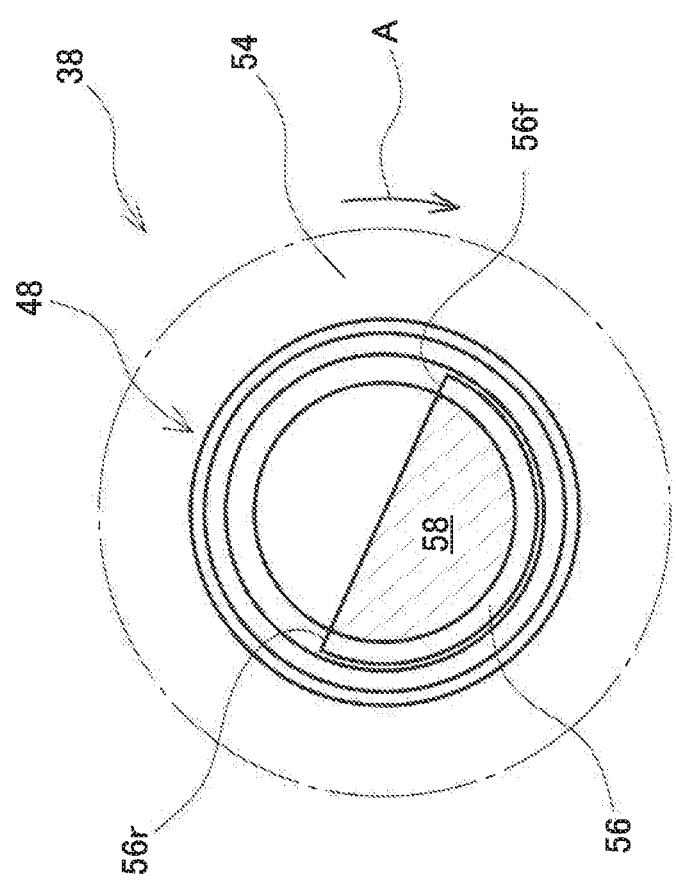
FIG. 5 is a view showing the periphery of a bearing holding portion of the end cover.

FIG. 4 is a perspective view showing the case inside of the end cover 46, and FIG. 5 is a view of the bearing holding portion 48 of the end cover 46 as seen in a direction along the rotational axis L. A case inner wall surface 54, which is the case inner surface of the end cover 46, includes the bearing holding portion 48. A case-side circumferential wall 56 extending in the circumferential direction around the rotational axis L is provided to stand on a surface of the bearing holding portion 48 facing the rotor 12. The case-side circumferential wall 56 is in the shape of an arc, and is arranged to surround the rotor shaft 26 on the lower side of the rotor shaft 26 when the rotating electrical machine 10 is installed. The case-side circumferential wall 56 is also arranged so that a rear end 56r is positioned higher than a front end 56f in a rotation direction A of the rotor 12. In the rotating electrical machine 10, the case-side circumferential wall 56 is in the shape of an arc with a central angle of 180°; that is, is of a semicircular shape.

As can be seen from FIG. 1, the rotor-side circumferential wall 52 and the case-side circumferential wall 56 are placed in close proximity, and the gap therebetween is narrow. The gap is narrowed to such an extent to reduce the passage of oil for lubricating a movable portion and for cooling a heat generating portion. Hereinafter, the oil is referred to as the coolant. As described above, by narrowing the gap between the rotor-side circumferential wall 52 and the case-side circumferential wall 56 to reduce the flow of the coolant, it is possible to form, in the portion between the rotor 12 and the case 16, a coolant reservoir 58 which receives and stores the coolant that is sent to the upper part in the case 16 and then falls down. The coolant flow passages 36 provided in the rotor 12 are arranged to be open with respect to the coolant reservoir 58, at the end on the end cover 46 side.

FIG. 6 is an enlarged cross-sectional view showing a portion where the end surface of the rotor 12 and the inner wall surface of the case face each other, particularly the periphery of the rotor-side circumferential wall 52 and the case-side circumferential wall 56. The rotor-side circumferential wall 52 is positioned on the radially outer side of the case-side circumferential wall 56, and distal end portions of the rotor-side circumferential wall 52 and the case-side circumferential wall 56 are adjacent to each other in the radial direction. An inward flange 60 extending radially inward is provided over the entire circumference on the distal end edge of the rotor-side circumferential wall 52. By increasing the dimensional precision of the distal end of the inward flange 60 by mechanical processing or the like, it is possible to narrow the gap between the inward flange 60 and the case-side circumferential wall 56, and it is possible to efficiently store the coolant.

The coolant reservoir 58 is formed by the first and second side surfaces defined by the end surface of the rotor 12 and the inner wall surface of the case 16, which face each other, and a circumferential surface defined by the rotor-side circumferential wall 52 and the case-side circumferential wall 56. The first side surface is defined by the end surface of the rotor 12; specifically, in the surface of the base plate portion 50 of the first end plate 28, which faces the case 16 in the axial direction, a portion of the surface inside the circumferential wall 52. The second side surface is defined by the case inner wall surface 54 (see FIG. 4), specifically, a circular segment portion inside the case-side circumferential wall 56. Particularly, in this embodiment, the second side surface is semicircular in shape. The circumferential surface is defined by three surfaces of the case-side circumferential wall 56, which are an inner circumferential surface 56a, a distal end edge surface 56b, and an outer circumferential surface 56c on a further tip side than the inward flange 60; and an inner circumferential surface 52a of the rotor-side circumferential wall 52; and an inner side face 60a of the inward flange 60.

The first end plate cooling hole 40, which is a part of the coolant flow passage 36, is formed adjacent to the rotor-side circumferential wall 52, at a position radially further inward than the rotor-side circumferential wall 52. The core plate cooling holes 38 and the second end plate cooling hole 42, which form the coolant flow passage 36 together with the first end plate cooling hole 40, are formed at positions displaced radially further outward from the first end plate cooling hole 40 while maintaining a portion overlapping the first end plate cooling hole 40. Consequently, a slope is formed in the portion where the first end plate cooling hole 40 and the core plate cooling holes 38 are adjacent to each other. When the rotor 12 rotates, the centrifugal force acting on the coolant in this slope portion acts as a driving force to descend the coolant (radially outward) along the slope. This driving force promotes the flow of the coolant from the coolant reservoir 58 through the rotor core 24 toward the opposite end surface of the rotor 12.

In the rotating electrical machine 10, the coolant accumulated in the lower part of the case 16 is sent to the upper part by a pump (not shown) and is thrown on the heat generating coils 20, particularly the coil ends 22, and cools the coils 20 and the coil ends 22. The coolant also lubricates the bearing. A part of the coolant that has passed through the coil ends 22 is received and accumulated in the coolant reservoir 58. Further, the coolant is lifted upward by the rotor 12 or the structure that rotates together with the rotor 12, and a part of the lifted coolant is also received in the coolant reservoir 58. The opening of each coolant flow passage 36 on the coolant reservoir 58 side intermittently sinks into the coolant reservoir 58 with the rotation of the rotor 12. When the opening of the coolant flow passage 36 is open with respect to the coolant reservoir 58, the coolant flows from the coolant reservoir 58 through the coolant flow passage 36 to the opposite end surface, and cools the rotor core 24 from inside in this process.

In the rotating electrical machine 10, the rotor-side circumferential wall 52 and the case-side circumferential wall 56 face each other in part in the radial direction, but the rotor-side circumferential wall and the case-side circumferential wall are not necessarily arranged in this fashion and may be arranged so that the distal end edges thereof face each other. Further, instead of the inward flange 60 provided on the rotor-side circumferential wall 52, an outward flange may be provided on the case-side circumferential wall 56.

Like the rotating electrical machine 10, when the coaxial structure in which the transmission shaft 32 is passing through the inside of the hollow rotor shaft 26 is adopted, it is difficult to supply the coolant to the rotor core 24 through the rotor shaft 26. In the rotating electrical machine 10, by providing the coolant reservoir 58 facing the end surface of the rotor 12, it is possible to send the coolant from the coolant reservoir 58 to the inside of the rotor core 24. In addition, even if a solid shaft structure without a coolant flow passage in the rotor shaft is adopted, it is possible to send the coolant from the end surface of the rotor to the inside of the rotor core.

REFERENCE SIGNS LIST 10 rotating electrical machine, 12 rotor, 14 stator, 16 case, 18 stator core, 20 coil, 22 coil end, 24 rotor core, 26 rotor shaft, 28 first end plate, 30 second end plate, 32 transmission shaft, 34 shaft coupling, 36 coolant flow passage, 38 core plate cooling hole, 40 first end plate cooling hole, 42 second end plate cooling hole, 44 case main body, 46 end cover, 48 bearing holding portion, 50 base plate portion, 52 rotor-side circumferential wall, 54 case inner wall surface, 56 case-side circumferential wall, 58 coolant reservoir, 60 inward flange.

The invention claimed is:

1. A rotating electrical machine comprising:
a case,
a rotor supported rotatably about a rotational axis by the case;
a coolant reservoir located adjacent to a rotor end surface of the rotor and configured to store a coolant, the coolant reservoir being formed by a first side surface defined by the rotor end surface, a second side surface defined by a case inner wall surface of the case facing the rotor end surface, and a circumferential surface defined by a case-side circumferential wall standing on the case inner wall surface and extending in a circumferential direction around the rotational axis, and a rotor-side circumferential wall standing on the rotor end surface and extending over an entire circumference around the rotational axis; and
a coolant flow passage extending and penetrating the rotor in a direction along the rotational axis and having one end arranged to be open with respect to the coolant reservoir so that the coolant flows through the coolant flow passage, wherein:
the rotor-side circumferential wall is located at a position radially further outward than the case-side circumferential wall, and
a distal end edge of the rotor-side circumferential wall has an inward flange extending radially inward and having a distal end adjacent to an outer surface of the case-side circumferential wall.

2. The rotating electrical machine according to claim 1, wherein
the rotor includes rotor core plates stacked in a direction along the rotational axis to form a rotor core, and end plates located at both ends of the stacked rotor core plates,
the end plate located on the coolant reservoir side has an end plate cooling hole formed to be a part of the coolant flow passage, and
each of the rotor core plates has a core plate cooling hole formed to be a part of the coolant flow passage, at a position displaced radially further outward from the end plate cooling hole.

* * * * *